(12) United States Patent
Itoh et al.

(10) Patent No.: US 10,728,537 B2
(45) Date of Patent: Jul. 28, 2020

(54) PHOTOGRAPHING DEVICE AND PHOTOGRAPHING METHOD

(71) Applicant: Hitachi, Ltd., Chiyoda-ku, Tokyo (JP)

(72) Inventors: Masaya Itoh, Tokyo (JP); Ryosuke Miki, Tokyo (JP); So Sasatani, Tokyo (JP); Kenichirou Kurata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/327,968

(22) PCT Filed: Aug. 29, 2016

(86) PCT No.: PCT/JP2016/075130
§ 371 (c)(1),
(2) Date: Feb. 25, 2019

(87) PCT Pub. No.: WO2018/042481
PCT Pub. Date: Mar. 8, 2018

(65) Prior Publication Data
US 2019/0230347 A1 Jul. 25, 2019

(51) Int. Cl.
*H04N 17/00* (2006.01)
*G03B 43/00* (2006.01)
(Continued)

(52) U.S. Cl.
CPC ........... *H04N 17/002* (2013.01); *G03B 15/00* (2013.01); *G03B 35/08* (2013.01); *G03B 43/00* (2013.01);
(Continued)

(58) Field of Classification Search
CPC .. H04N 17/002; H04N 5/2354; H04N 5/2353; H04N 13/296; H04N 13/204;
(Continued)

(56) References Cited

U.S. PATENT DOCUMENTS

2011/0187886 A1 8/2011 Nakajima et al.
2013/0120536 A1 5/2013 Song et al.

FOREIGN PATENT DOCUMENTS

EP   2 670 147 A2   12/2013
JP   11-177964 A    7/1999
(Continued)

OTHER PUBLICATIONS

International Search Report (PCT/ISA/210) issued in PCT Application No. PCT/JP2016/075130 dated Nov. 8, 2016 with English translation (four (4) pages).
(Continued)

*Primary Examiner* — Jared Walker
(74) *Attorney, Agent, or Firm* — Crowell & Moring LLP

(57) ABSTRACT

A photographing device for photographing a monitored area has a state diagnosis of a camera using a stereo camera configured by two or more cameras. A diagnostic pattern database is provided in which information on a plurality of images having different photographing conditions obtained by the stereo camera are stored in advance as diagnostic patterns. Disparity information is acquired based on image data from the stereo camera and a state diagnosis of the camera is performed by determining whether the camera is abnormal or normal based on the disparity information with reference to the information on the plurality of images having different photographing conditions stored in the diagnostic pattern database. Upon receiving a result of the state diagnosis, at least one of illumination control, shutter control, and posture control of the camera or the stereo camera is performed.

6 Claims, 6 Drawing Sheets

(51) Int. Cl.
*G03B 35/08* (2006.01)
*G06T 7/80* (2017.01)
*H04N 13/204* (2018.01)
*H04N 13/296* (2018.01)
*H04N 5/235* (2006.01)
*H04N 13/00* (2018.01)
*G03B 15/00* (2006.01)

(52) U.S. Cl.
CPC ............ *G06T 7/85* (2017.01); *H04N 5/2353* (2013.01); *H04N 5/2354* (2013.01); *H04N 13/204* (2018.05); *H04N 13/296* (2018.05); *G06T 2207/10012* (2013.01); *G06T 2207/30232* (2013.01); *H04N 2013/0081* (2013.01)

(58) Field of Classification Search
CPC ............ H04N 2013/0081; G03B 35/08; G03B 15/00; G03B 43/00; G06T 7/85; G06T 2207/30232; G06T 2207/10012
USPC .......................................................... 348/48
See application file for complete search history.

(56) References Cited

FOREIGN PATENT DOCUMENTS

| JP | 2001-211466 A | 8/2001 |
|---|---|---|
| JP | 2004-363753 A | 12/2004 |
| JP | 2011-182387 A | 9/2011 |
| JP | 2013-530466 A | 7/2013 |
| JP | 2014-6243 A | 1/2014 |

OTHER PUBLICATIONS

Japanese-language Written Opinion (PCT/ISA/237) issued in PCT Application No. PCT/JP2016/075130 dated Nov. 8, 2016 (three (3) pages).

Zhang, Z., "A Flexible New Technique for Camera Calibration", IEEE Transactions on Pattern Analysis and Machine Intelligence, 2000, pp. 1-21, vol. 22 No. 11, Technical Report MSR-TR-98-71, Microsoft Corporation, Redmond, WA, (22 pages).

[FIG. 1]
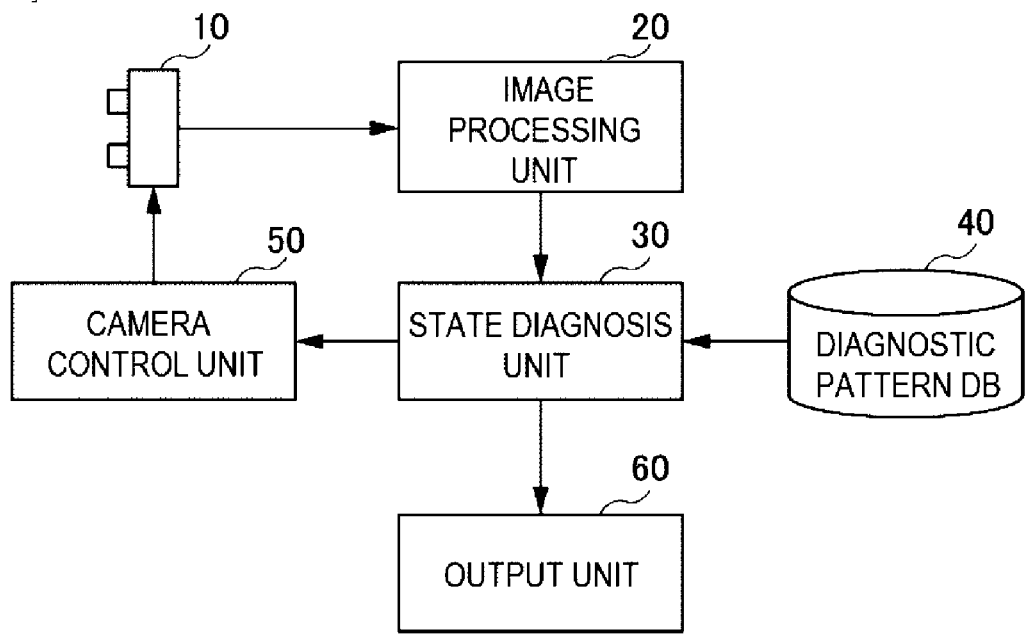
[FIG. 2]
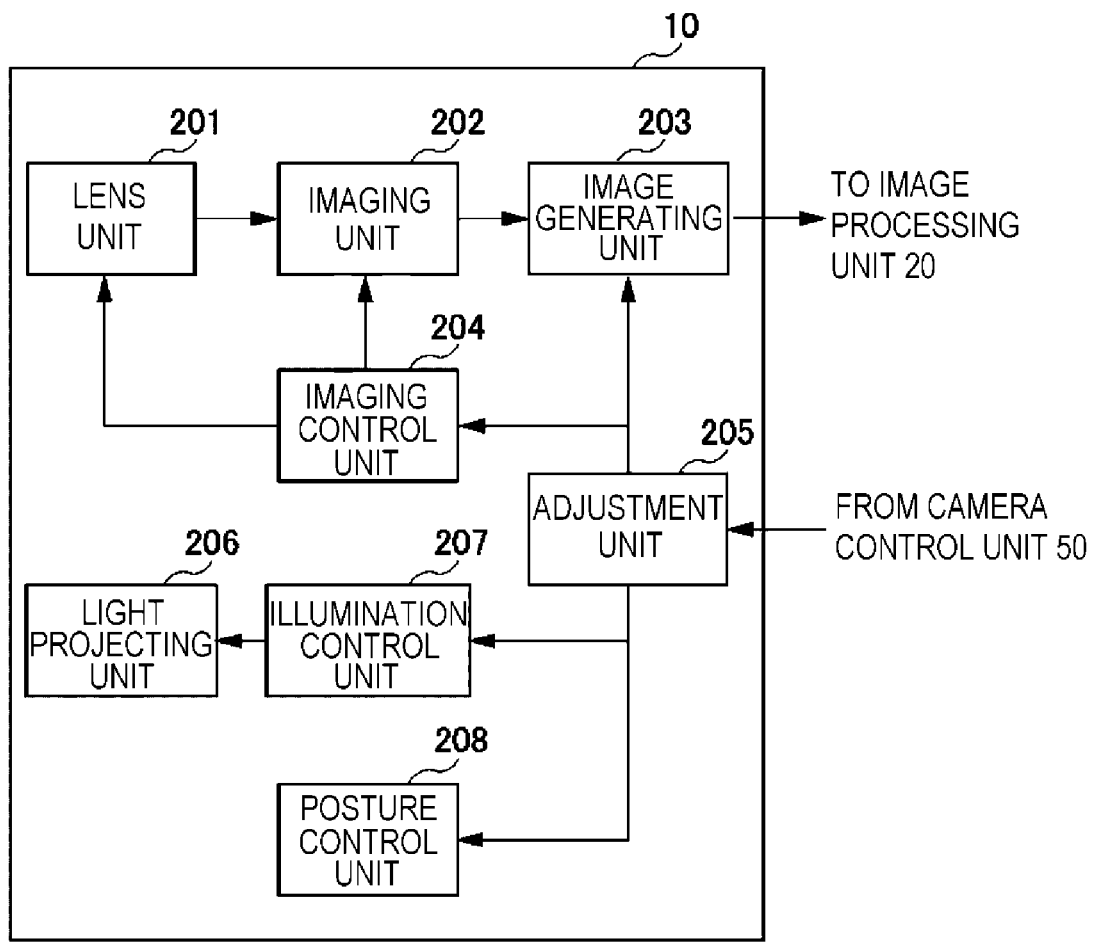

[FIG. 3]
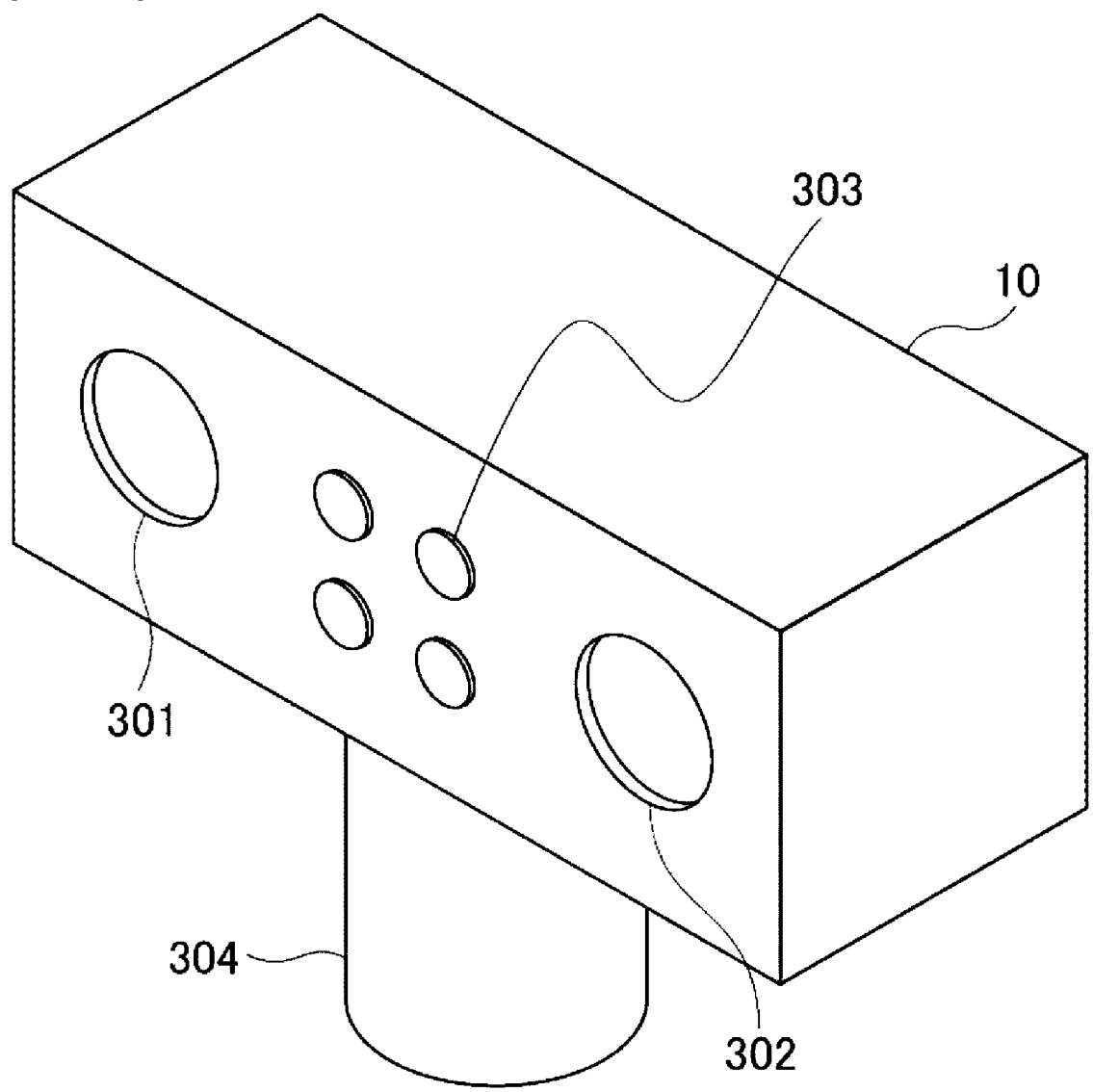

[FIG. 4]
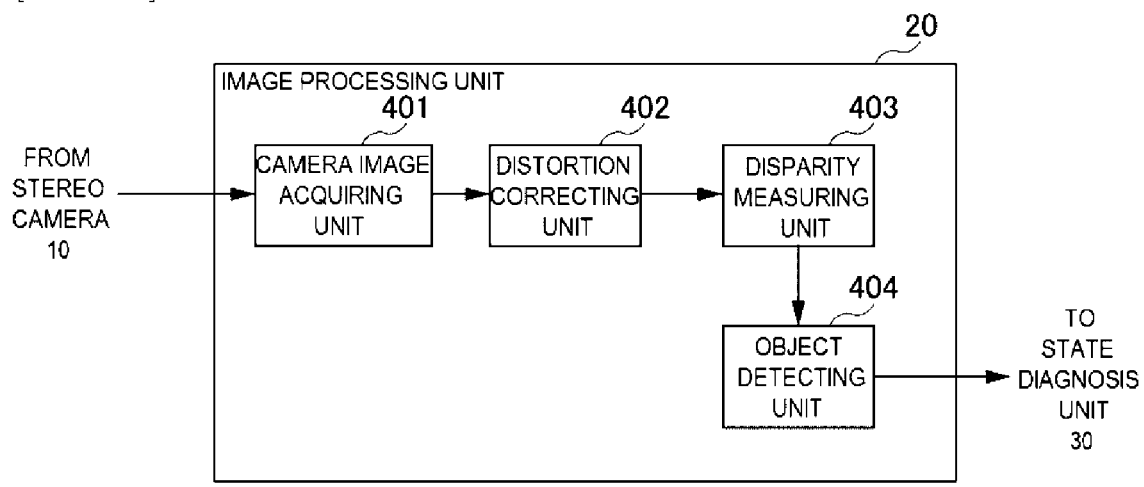
[FIG. 5]
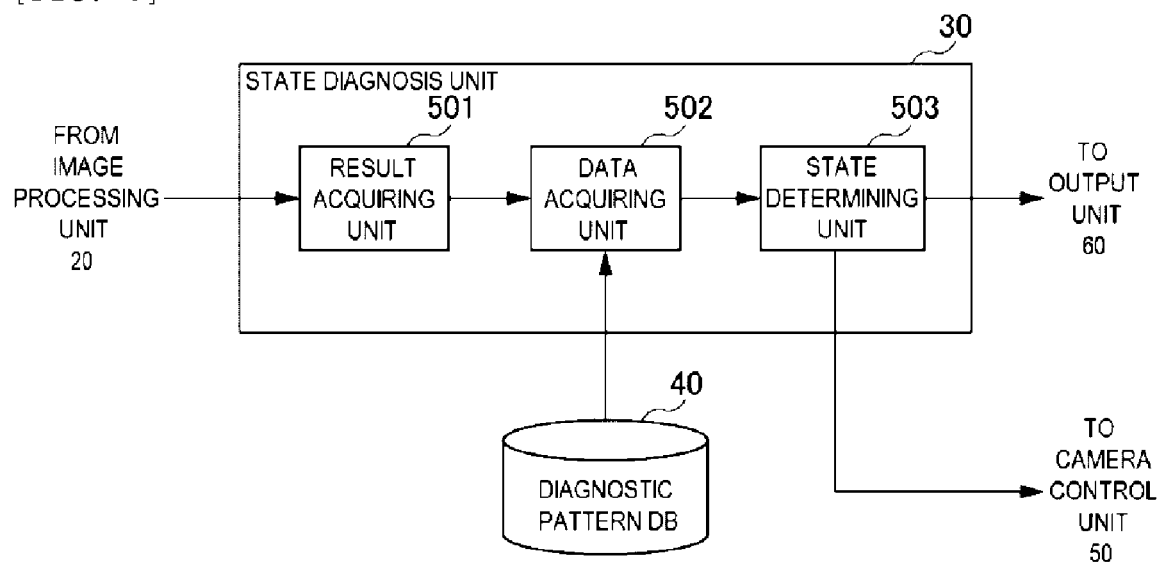

[FIG. 6]
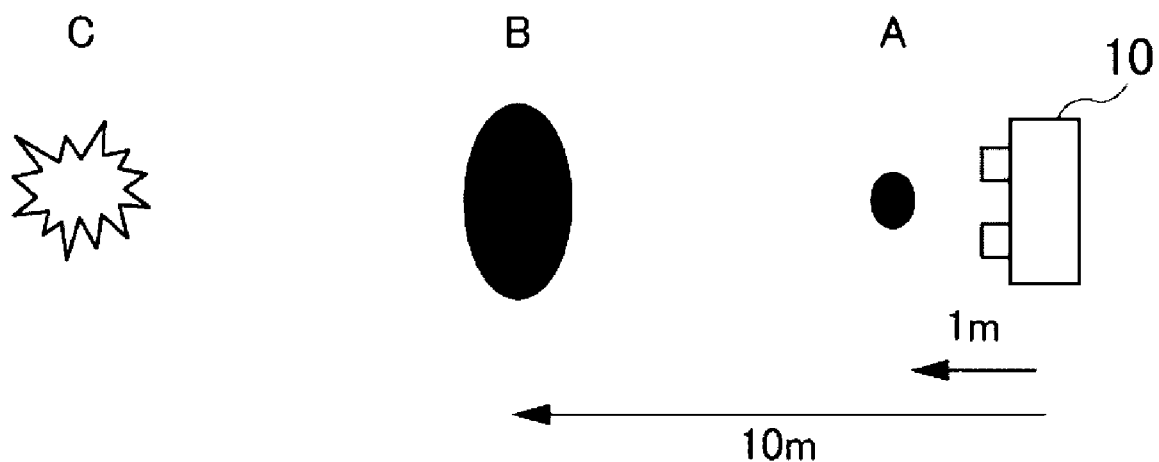
[FIG. 7]
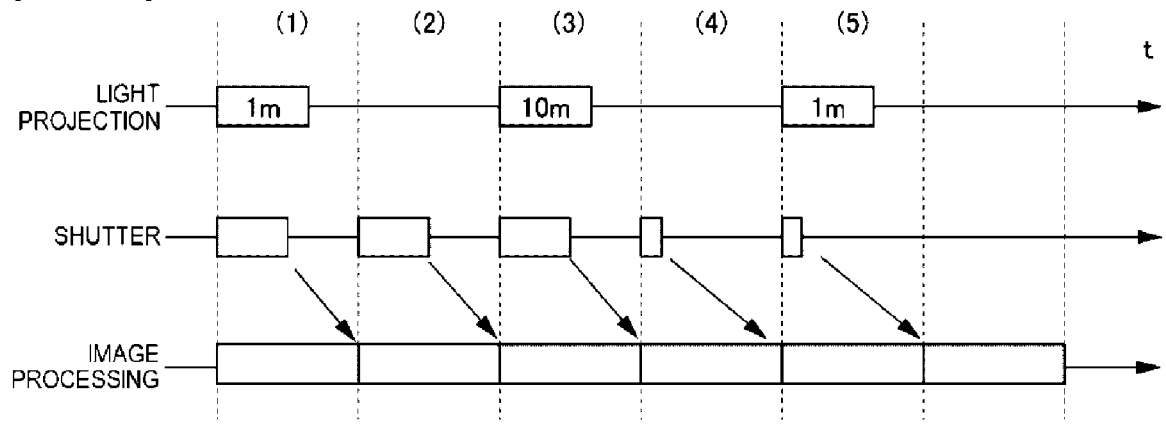

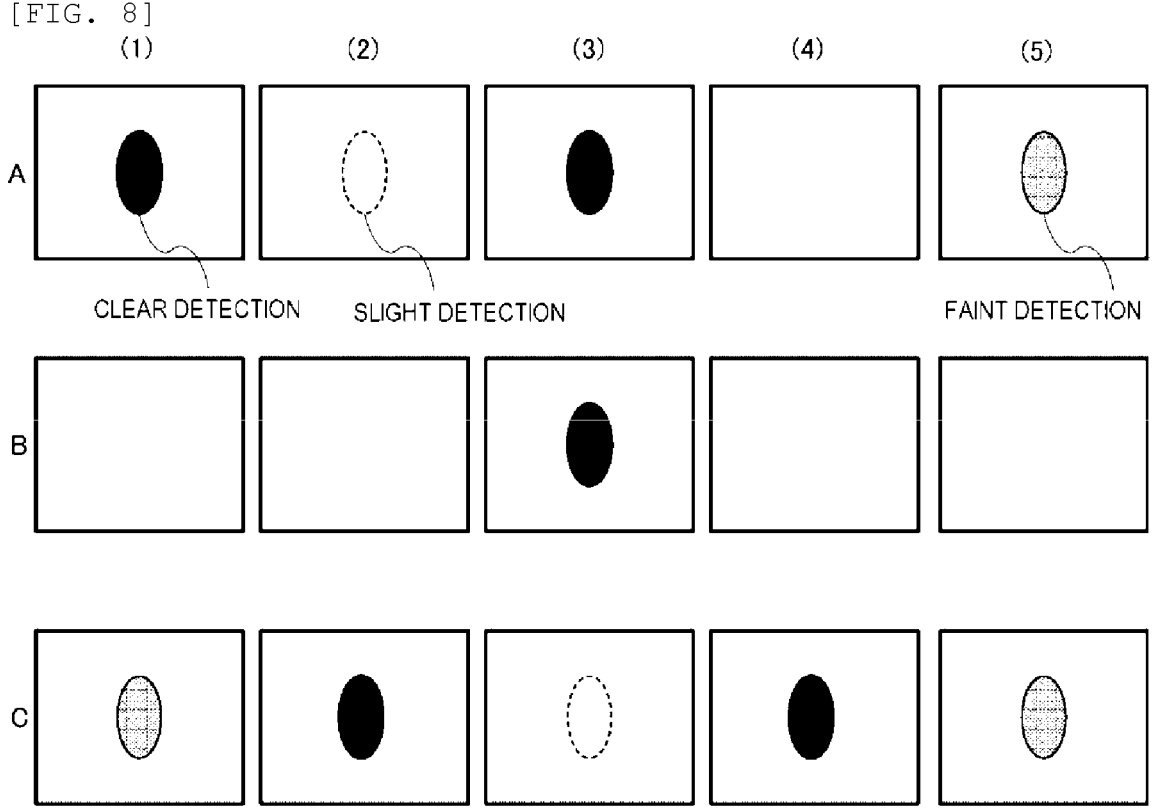

[FIG. 9]
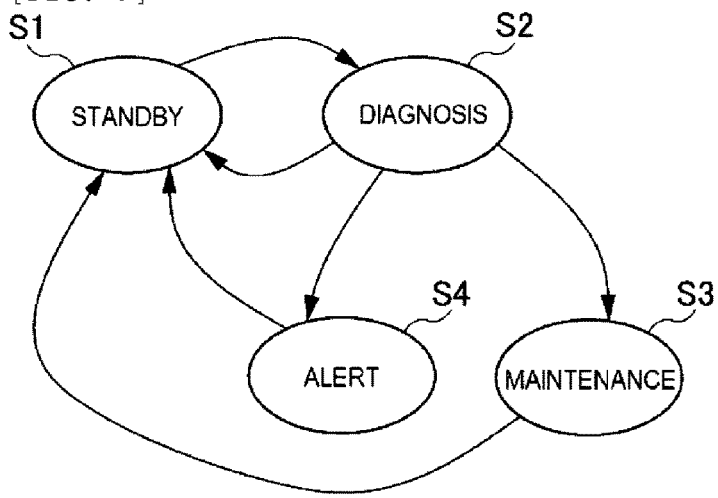
[FIG. 10]
| | (1) | (2) | (3) | (4) | (5) | DETERMINATION RESULT | PROCESSING MODE |
|---|---|---|---|---|---|---|---|
| 98a | > 100 | — | — | — | — | ABNORMAL CANDIDATE | DIAGNOSIS |
| 98b | > 100 | > 20 | > 100 | 0 | > 50 | ADHERED SUBSTANCE | MAINTENANCE |
| 98c | 0 | 0 | > 100 | 0 | 0 | DISTANT OBJECT | ALERT |
| 98d | > 50 | > 100 | > 20 | > 100 | > 50 | LIGHT EMITTER | STANDBY |
| | ... | ... | ... | ... | ... | ... | ... |
| | | | | | | | |

PHOTOGRAPHING DEVICE AND PHOTOGRAPHING METHOD

TECHNICAL FIELD

The present invention relates to a photographing device and a photographing method used for monitoring.

BACKGROUND ART

In related fields, a video monitoring system which has a function of recognizing an object such as a person or a vehicle appearing in a monitored area or measured by performing image processing on a video acquired from a camera is proposed.

By using a detection result of the camera, the video monitoring system can, for example, display a warning or an icon on some display device, or sound a buzzer or the like to call attention of monitoring staff. Therefore, the video monitoring system contributes to reduce burden in a related-art monitoring task in which a confirming operation is always required.

In addition, it is also common to provide a camera system on a moving object such as a car or a robot and use the camera system in safe driving control for recognizing surroundings, or in a service robot for supporting a person.

Further, in order to improve accuracy or the like, a video monitoring system is proposed in which a stereo camera is used to measure a distance to a subject so that a more stable recognition function is achieved compared to a case where only an image is used.

In addition, a stereo camera which is not influenced by severe conditions such as backlight, darkness, or external environments such as road surface conditions is proposed in an in-vehicle imaging device or the like (refer to PTL 1). In a technique described in PTL 1, disparity image data is generated based on stereo image data from the stereo camera, and whether the camera is in a normal state or an abnormal state is determined by determining a normal or abnormal state of the disparity image data.

PRIOR ART LITERATURE

Patent Literature

PTL 1: JP-A-2014-6243

SUMMARY OF INVENTION

Technical Problem

However, in a related-art video monitoring system, desired detection accuracy cannot be ensured when, for example, some abnormality occurs in a camera, or dirt, attachment or the like is adhered to the camera. Therefore, reliability of the video monitoring system is impaired due to an abnormality of the camera or the like.

In addition, an intruder who performs an illegal action such as theft may change a photographing angle of the camera, or may place a blocking object in front of the camera, or may damage a camera lens so as not to leave video evidence, thereby causing a problem.

Further, in the technique described in PTL 1, since the normal and abnormal states of the camera are classified based on distribution of the disparity image data, the classification works only when disparity is available. For this reason, in a case where disparity image data cannot be obtained in a dark place where photographing is difficult, or in a case where luminance distribution at the time of photographing is uniform in a plane and no change can be observed on an image, it is difficult to clearly classify the normal and abnormal states of the camera.

Further, in a case where such a camera device is used in a security field, even if the camera device is normal, the video monitoring system may not operate normally when an intruder intentionally changes an orientation of the camera or covers the lens of the camera. Therefore, it is impossible to prevent a crime of an intruder or the like in advance simply by classifying the normal or abnormal state of the camera device.

Further, in the case described in PTL 1, the abnormal state is determined in a case where disparity information cannot be normally obtained, and in a case where disparity information is normally obtained, even if dirt adheres to the lens, the dirt will be neglected, and the dirt will not be determined as dirt. That is, if the lens of the camera is originally adhered with dirt, the lens may be determined as normal although the lens should be determined as abnormal, thereby causing an error. Therefore, the state of the camera is not determined normally.

An object of the invention is to improve the reliability of an entire system including a camera device without reducing a security level when recognizing an object by image processing.

Solution to Problem

In order to solve the above problems, for example, a configuration described in the claims is adopted.

In order to solve the above problems, a photographing device of the invention includes: a stereo camera which is configured by two or more cameras; an image processing unit which acquires disparity information based on image data from the stereo camera; and a diagnostic pattern database which stores information on a plurality of images having different photographing conditions obtained by the stereo camera as diagnostic patterns in advance.

The photographing device of the invention further includes: a state diagnosis unit which determines a state of a camera and performs state diagnosis based on the disparity information obtained from the image processing unit with reference to the information on the plurality of images having different photographing conditions stored in the diagnostic pattern database; and a camera control unit which performs at least one of illumination control, shutter control, and posture control of the stereo camera upon receiving a diagnosis result of the state diagnosis unit.

A photographing method of the invention includes: a step of photographing a monitored area by a stereo camera to obtain data of left and right images; a step of acquiring, by an image processing unit, disparity information of a photographed image based on the data of left and right images photographed by the stereo camera; a step of storing information on a plurality of images having different photographing conditions photographed by the stereo camera in a diagnostic pattern database in advance as diagnostic patterns; and a step of determining a state of a camera and performing camera state diagnosis by a state diagnosis unit based on the disparity information acquired by the image processing unit and the information on the plurality of images having different photographing conditions stored in the diagnostic pattern database in advance.

Problems, configurations and effects other than the above will be apparent with reference to description of following embodiments.

Advantageous Effect

According to the invention, it is possible to stably determine whether a state of a camera is normal or abnormal without reducing a security level. In addition, by appropriately switching the state of the camera to an appropriate mode, even when performance of the camera is reduced due to some factors, application can be stably executed. Further, by executing processing corresponding to the state of the camera, reliability of an entire system can be improved.

Problems, configurations and effects other than the above will be apparent with reference to description of following embodiments.

BRIEF DESCRIPTION OF DRAWINGS

FIG. 1 is a system block diagram showing an entire configuration of a photographing device according to an embodiment of the invention.

FIG. 2 is a block diagram for explaining an internal function of a stereo camera used in the photographing device according to the embodiment of the invention.

FIG. 3 is an external view of the stereo camera used in the photographing device according to the embodiment of the invention.

FIG. 4 is a function block diagram showing a function of an image processing unit used in the photographing device according to the embodiment of the invention.

FIG. 5 is a function block diagram showing a function of a state diagnosis unit used in the photographing device according to the embodiment of the invention.

FIG. 6 is a diagram showing an example of an environment measured by the photographing device according to the embodiment of the invention.

FIG. 7 is a diagram showing a control pattern of the stereo camera in the photographing device according to the embodiment of the invention.

FIG. 8 is a diagram showing an example of a detection result obtained in the photographing device according to the embodiment of the invention.

FIG. 9 is a diagram showing a state transition of a processing mode in the photographing device according to the embodiment of the invention.

FIG. 10 is a diagram showing a diagnostic pattern and a determination result for a state diagnosis in the photographing device according to the embodiment of the invention.

DESCRIPTION OF EMBODIMENTS

Entire Configuration of Embodiment of the Invention

Hereinafter, an example of a photographing device (hereinafter referred to as "the example") according to an embodiment of the invention will be described with reference to the drawings.

The invention is a photographing device generally applicable to a camera system for monitoring, and a stereo camera device will be described below as an example.

FIG. 1 is a block diagram showing a configuration of an entire system using a stereo camera device as an example of the photographing device of the example.

The photographing device of the example includes: a stereo camera 10; an image processing unit 20; a state diagnosis unit 30; a storage device 40 (hereinafter, referred to as a "diagnostic pattern database 40") including a database in which a diagnostic pattern is stored; a camera control unit 50; and an output unit 60.

The diagnostic pattern database 40 stores a plurality of diagnostic patterns photographed in advance, and the state diagnosis unit 30 determines whether a camera is normal or abnormal by referring to the diagnostic patterns using disparity information obtained from the stereo camera 10 as a trigger. Details thereof will be described later.

[Configuration of Stereo Camera 10]

FIG. 2 shows a specific configuration of the stereo camera 10 used in the example. As shown in FIG. 2, the stereo camera 10 includes: a lens unit 201, an imaging unit 202, and an image generating unit 203. The stereo camera 10 further includes: an imaging control unit 204, an adjustment unit 205, a light projecting unit 206, an illumination control unit 207, and a posture control unit 208. Although the stereo camera 10 requires two (a pair of) lens units 201 and two photographing units 202 in order to obtain left and right images, only one lens unit 201 and one imaging unit 202 are shown in FIG. 2 for simplification.

The lens unit 201 is an optical lens for photographing. The imaging unit 202 is a so-called image sensor, and an image sensor including a photographing element (not shown) such as a complementary metal oxide semiconductor (CMOS) or a charge coupled device (CCD) can be used.

The imaging unit 202 converts a video took from the lens unit 201 into an electrical signal, and supplies the electrical signal to the image generating unit 203. The image generating unit 203 performs predetermined processing such as noise reduction, color correction, and image synthesis on an image sent from the imaging unit 202, and supplies processed image data to the subsequent image processing unit 20.

The imaging control unit 204 controls parameters such as a shutter, an aperture, and a zoom of a camera in the imaging unit 202 based on a control signal from the adjustment unit 205 to be described later.

The light projecting unit 206 is a member which emits light to a subject to be photographed for illumination. Usually visible light is used, but other than visible light, near infrared light or far infrared light may also be used depending on the subject. The light projecting unit 206 is particularly effective in photographing an object in a dark area, and thus even an image of low luminance can be stably acquired.

The illumination control unit 207 controls an intensity level of light emitted from the light projecting unit 206 based on a control signal from the adjustment unit 205 to be described later. In addition, depending on a result of a state diagnosis in the state diagnosis unit 30 in FIG. 1, for example, control such as switching between left and right illumination may be performed.

The posture control unit 208 performs control to change a posture, an orientation or the like of the camera. Accordingly, the stereo camera 10 of the example can be configured as a so-called pan-tilt camera which is capable of dynamically changing the orientation of the camera. That is, photographing is performed again after the posture and the orientation of the camera is changed by the posture control unit 208, and therefore, an image different from the previous image can be obtained. The pan-tilt camera refers to a camera capable of dynamically changing both of an angle in a horizontal direction (panning angle) and an angle in a vertical direction (tilting angle), and may also be a camera capable of changing an angle in only the horizontal direction or the vertical direction.

The adjustment unit 205 controls functions of each of the image generating unit 203, the imaging control unit 204, the illumination control unit 207, and the posture control unit 208 based on a control signal from the camera control unit 50 shown in FIG. 1. That is, as a result of the diagnosis of the state of the camera in the state diagnosis unit 30 in FIG. 1, a control signal is supplied to the camera control unit 50 from the state diagnosis unit 30. Then, the camera control unit 50 sends various control signals to each part of the stereo camera 10 via the adjustment unit 205, and performs the above-described camera control.

FIG. 3 shows a configuration of the stereo camera 10 shown in FIG. 1 and FIG. 2 as an integrated device. Since two lens units 201 are required in FIG. 2, the lens units are shown as a lens 301 and a lens 302 in FIG. 3. In addition, the light projecting unit 206 of FIG. 2 is shown as a light projecting unit 303 in FIG. 3. A light emission diode (LED), for example, is used as the light projecting unit 303, and light (emitted light) projected from the light projection unit 303 is reflected by an object serving as a subject, and is incident on the lens units 301 and 302 of the stereo camera 10. Accordingly, left and right images of the subject are obtained from the stereo camera 10.

As shown in FIG. 3, in consideration of an amount of light to be emitted, the light projecting unit 303 is provided with a plurality of LEDs. By controlling the plurality of LEDs in accordance with an orientation of light emitted from the light projecting unit 303 or a distance to the subject, the light having the adjusted light amount from the light projecting unit 303 is applied toward a specific area.

A stage 304 of the stereo camera 10 in FIG. 3 is a part where the camera control unit 50 of FIG. 2 is disposed, and the stage 304 has a manipulation function capable of controlling a posture of the camera with two axes in a horizontal direction and a vertical direction, for example. Therefore, the camera control unit 50 disposed on the stage 304 can direct the orientation of the camera in a specific direction. In addition, as will be described later, when the camera is determined to be abnormal, the direction of the camera is freely changed so as to perform photographing again.

Referring back to FIG. 1, the entire configuration of the photographing device of the example will be continuously described. Data of left and right images acquired by the stereo camera 10 is transmitted to the image processing unit 20. In the image processing unit 20, a process is executed as shown in FIG. 4 which will be described later, and a processing result is transmitted to the state diagnosis unit 30.

As shown in FIG. 1, the photographing device of the example includes the diagnostic pattern database 40. The diagnostic pattern database 40 is stored with diagnostic patterns for classifying a state of the camera in advance based on information on a plurality of images having different photographing conditions photographed by the stereo camera 10.

In the photographing method of the example, this is a step of storing the information on the plurality of images having different photographing conditions photographed by a stereo camera in a diagnostic pattern database as diagnostic patterns in advance.

As will be described later with reference to FIG. 5, the state diagnosis unit 30 reads the diagnostic patterns stored in the diagnostic pattern database 40 in advance, and performs diagnosis processing on output data from the image processing unit 20 with reference to the diagnostic patterns. A processing result of the state diagnosis unit 30 is sent to the output unit 60, and is usually presented as a video using a terminal device such as a liquid crystal display device or a cathode ray tube (CRT) display device.

The diagnosis result output to the output unit 60 may be displayed as a Red-Green-Blue (RGB) monitor output, or may be transmitted to a central server via a network as a data file output. Further, it is also possible to call attention to the surroundings by using an alarm device such as a buzzer.

In addition, the state diagnosis unit 30 sends the diagnosis result to the camera control unit 50 as control data for the stereo camera 10. The camera control unit 50 controls the stereo camera 10 based on the control data sent from the state diagnosis unit 30. That is, as described above, the imaging control unit 204, the image generating unit 203, the illumination control unit 207, and the posture control unit 208 are controlled according the control signal from the camera control unit 50 through the adjustment unit 205 of the stereo camera 10.

[Configuration and Function of Image Processing Unit 20]

FIG. 4 is a function block diagram illustrating functions of the image processing unit 20 in FIG. 1 as blocks. As shown in FIG. 4, the image processing unit 20 includes a camera image acquiring unit 401, a distortion correcting unit 402, a disparity measuring unit 403, and an object detecting unit 404.

In the photographing device of the example, positional relationships between the camera and the real environment, such as a distance between the left and right lenses in the stereo camera 10, focal length of a lens, height of the camera, and an orientation of the camera are acquired in advance as advance preparation. That is, it is necessary to obtain in advance, by calibration, a coordinate system indicating a position of the camera in the real environment in which the camera is provided.

External parameters such as the orientation and the posture of the stereo camera 10 can be obtained in advance by projecting a pattern such as a checker chart onto the real environment or by attaching the pattern to the lens of the camera. This method is described in, for example, Z. Zhang, "A flexible new technique for camera calibration", IEEE Transactions on Pattern Analysis and Machine Intelligence, 22(11):1330-1334, 2000. Accordingly, the positional relationship between the stereo camera 10 and the object to be photographed is known, and the position of the detected object in the real environment can be specified.

Similarly to the external parameters, internal parameters such as distortion of the lens of the stereo camera 10 and a focal length can also be obtained in advance by projecting or attaching a pattern such as a checker chart.

Although the stereo camera 10 is usually used as a passive sensor, a pattern irradiation type active sensor capable of acquiring three-dimensional information may be used instead of such stereo camera 10. It is also possible to use an active sensor, which is known as a Time-of-Flight type active sensor, capable of measuring a time required for emitted light such as a laser beam, to be reflected from a subject and returns back. In this way, by using the pattern irradiation type sensor or the Time-of-Flight type active sensor, the position of the object can be easily specified as compared with the passive sensor.

As shown in FIG. 4, the image processing unit 20 acquires the left and right camera images from the stereo camera 10 in the camera image acquiring unit 401. Next, the distortion correcting unit 402 corrects distortion of the left and right camera images acquired by the camera image acquiring unit 401 based on predetermined parameters. The distortion correction is executed based on the internal and external parameters of the camera acquired in advance by a rectification processing in a parallel stereo processing.

In general, the "parallel stereo processing" is performed on the left and right camera images of the stereo camera 10 at the same time on the left and right, but distortion may occur in one or both of the lenses depending on characteristics of the lenses or the like, and a grid that should originally be parallel straight lines may be distorted and become curved lines having a curvature. Therefore, it is necessary to compare the left and right images after the distortion correction which changes the curved lines having the distortion into parallel straight lines. Such processing is the "rectification processing", which facilitates collation of the right and left camera images and makes it easier to obtain disparity image data.

The stereo camera images subjected to the distortion correction at the distortion correcting unit 402 are input to the disparity measuring unit 403 so as to be subjected to disparity measurement. The disparity measuring unit 403 obtains left and right disparity information (deviation amount of left and right positions) for each pixel of the left and right camera images. In addition, a distance to the subject can be calculated based on a principle of triangulation from the disparity information obtained for each pixel. In this sense, since the disparity information and the distance information are equivalent, hereinafter, the distance information will be collectively referred to as the "disparity information".

In the photographing method of the example, this is a step of photographing a monitored area to obtain left and right disparity data.

Output of the disparity measuring unit 403 is sent to the object detecting unit 404, where a position of a person such as an intruder or an object in the vicinity of the camera is detected, for example. Specifically, the object detecting unit 404 can easily detect an object using methods such as obtaining a difference between the image data from the disparity measuring unit 403 and background information photographed in advance.

A detection result of the object detecting unit 404 is sent to the state diagnosis unit 30 shown in FIG. 1. As described above, the processing from the camera image acquiring unit 401 to the object detecting unit 404 of the image processing unit 20 is a step of acquiring the disparity information based on the data of the left and right images photographed by the stereo camera.

In the above processing, a person or an object such as a vehicle is detected, but if the camera side is adhered with dirt, consequently, the object to be detected may not be detected normally, and the dirt or the like which should not be detected may be erroneously detected as a person. Alternatively, a disturber may place a blocking object or the like in front of the lens of the camera, and in such a case, the object to be detected may not be detected in a similar way. In such cases, it is necessary to take measures to clearly distinguish whether an object photographed by the camera is an actual intruder or dirt such as rubbish.

[Configuration and Function of State Diagnosis Unit 30]

Next, the configuration of the state diagnosis unit 30 and functions thereof will be described with reference to FIG. 5.

As shown in FIG. 5, the state diagnosis unit 30 includes a result acquiring unit 501, a data acquiring unit 502, and a state determining unit 503.

The result acquiring unit 501 acquires the disparity information which is a processing result from the image processing unit 20.

In addition, the data acquiring unit 502 acquires a diagnostic pattern which is prepared in advance based on predetermined conditions and stored in the diagnostic pattern database 40. Then, the acquired diagnostic pattern is sent to the state determining unit 503 together with the disparity information input from the result acquiring unit 501.

Further, the state determining unit 503 determines the state of the camera based on the disparity information from the result acquiring unit 501 with reference to the diagnostic pattern acquired by the data acquiring unit 502. A determination result in the state determination unit 503 is output to the camera control unit 50 and the output unit 60 shown in FIG. 1.

The processing of the result acquiring unit 501, the data acquiring unit 502, and the state determining unit 503 of the state diagnosis unit 30 is a step of determining the state of the camera and performing state diagnosis for the camera.

Next, the processing of the state diagnosis unit 30 shown in FIG. 5 will be described in detail with reference to FIG. 6 to FIG. 8.

FIG. 6 is a schematic diagram showing an example of three typical objects photographed by the stereo camera 10.

That is, in FIG. 6, three objects including a small object A in the vicinity of the camera, a distant large object B, and a distant light emitter C are provided with respect to the stereo camera 10. It is assumed that the object A is at a location close to the stereo camera 10 (1 m in the vicinity), and the object B is at a location (10 m away) far from the stereo camera 10. In addition, it is assumed that the light emitter C is an object that emits light by itself (self-emitting object) at a location farther than the object B.

As shown in FIG. 6, for the small object A placed at a distance of 1 m from the stereo camera 10 and the large object B placed at a distance of 10 m from the stereo camera 10, sizes of images photographed by the stereo camera 10 are substantially the same. In addition, since the light emitter C of FIG. 6 emits light to the stereo camera 10 by itself, the light emitter C may be erroneously recognized as an object such as an intruder. This example will be described below as a case where a person such as an intruder or an object such as a dangerous object is photographed in a situation where photographing is difficult without illumination especially in a dark place at night.

[Photographing Pattern Classification and Operation Sequence]

FIG. 7 shows an operation sequence of the imaging control unit 204 and the illumination control unit 207 of the stereo camera 10. In FIG. 7, the horizontal axis indicates a time axis, and each section of the sections (1) to (5) indicates light projection and shutter control patterns (1) to (5) (hereinafter referred to as "photographing patterns (1) to (5)") in the photographing device of the example.

Here, for illumination control, light projected from the light projecting unit 206 in FIG. 2 is simplified and described as two types including a "low intensity" illumination for photographing a distance of 1 m in the vicinity and a "high intensity" illumination for photographing a distance of 10 m away. In addition, the shutter control is simplified into two types including a case when an exposure time of the shutter is long and a case when the exposure time is short.

The photographing pattern (1) is a pattern in which the light projecting unit 206 of the stereo camera 10 photographs an area near the stereo camera 10 (1 m away in the vicinity) with weak illumination and a long exposure time.

The photographing pattern (2) is a pattern in which photographing is performed with no light projected from the light projection unit 206 of the stereo camera 10 and with a long exposure time.

The photographing pattern (3) is a pattern in which the light projecting unit 206 of the stereo camera 10 photographs an area far from the stereo camera 10 (10 m away in the distance) with strong illumination and a long exposure time.

The photographing pattern (4) is a pattern in which photographing is performed with no light projected from the light projection unit 206 of the stereo camera 10 and with a short exposure time.

The photographing pattern (5) is a pattern in which the light projecting unit 206 of the stereo camera 10 photographs a location 1 m away from the stereo camera 10 with weak illumination and a short exposure time.

The "image processing" shown in FIG. 7 indicates that the timing of the image processing in the image processing unit 20 of FIG. 4 is executed with a predetermined processing cycle. This image processing shows that in consideration of the time for generating image data, this timing becomes the next cycle of shutter operation, that is, the processing of the image photographed by the photographing pattern (1) is processed during a period when the next photographing pattern (2) is being executed.

FIG. 8 shows an image obtained by photographing the object A, the object B, and the light emitter C of FIG. 6 using the respective photographing patterns (1) to (5) of FIG. 7.

In the photographing pattern (1), since the object A is close to the camera and the exposure time is long, a clear image is detected even if the light projected from the light projection unit 206 is weak illumination. In FIG. 8, the clear image is represented by a black ellipse. Hereinafter, such detection is defined as "clear detection".

In addition, in the photographing pattern (1), since the object B is at a position 10 m away from the camera, the object B is not detected with the light projected from the light projection unit 206 being weak illumination. Further, since the light emitter C is an object that emits light by itself, even if the light projected from the light projection unit 206 is weak, the light emitter C is detected as a faint blurred light. In this way, a detection of an object with faint blurred light is defined as "faint detection" here. In FIG. 8, the "faint detection" is represented by a gray ellipse whose color is an intermediate color.

The photographing pattern (2) is a case in which no light is projected from the light projecting unit 206 and the exposure time is long. Even in a case where no light is projected from the light projecting unit 206, the object A at a position close to the camera is slightly detected because the exposure time is long. Since in a detection result of this detection, detected portions and portions that are not detected are mixed as noise is included, hereinafter, such detection is defined as "slight detection". In FIG. 8, the "slight detection" is represented by an ellipse having dotted outline.

Since the object B is far away (10 m ahead) from the camera, the object B is not detected in a state where no light is projected. In addition, the light emitter C is detected as a clearer image as compared with the photographing pattern (1) in which light is projected from the light projecting unit 206 since there is no light projection. This is because the light emitter C is an object that emits light by itself, and therefore, the clearer image is detected without illumination light.

The photographing pattern (3) is a case in which illumination light with high intensity is emitted from the light projecting unit 206 and the shutter exposure time is long. In this case, the detection of the nearby object A and the detection of the distant object B are both "clear detection". This is because the light projection for illumination is strong enough to reach a distant area. However, in the case of the light emitter C, since the emitted light is canceled by the illumination light, the light emitter C is hardly detected or detected as a blurred thin image. That is, an image similar to the image of the so-called "slight detection".

The photographing pattern (4) is a case where no light is projected from the light projecting unit 206 and the shutter exposure time is short. In the photographing pattern (4), since no light is projected and the exposure time is short, neither the nearby object A nor the distant object B is detected. However, for the light emitter C, the self-emitted light is clearly detected as no light is projected for illumination.

Finally, the photographing pattern (5) is a pattern in which the light emission of the light projecting unit 206 is weak and the shutter exposure time is short. Therefore, the object A placed in the vicinity is detected as "faint detection". However, the object B placed far away, such as 10 m away, is not detected. In addition, the self-emitted light of the light emitter C is detected as "faint detection" because no light is projected by the light projecting unit 206.

Next, the photographing patterns (1) to (5) described above are compared with each other and the photographing states in each of the photographing patterns (1) to (5) will be described focusing on each of the nearby object A, the distant object B, and the light emitter C.

The object A in the vicinity of the camera is clearly detected either in the weak illumination of the photographing pattern (1) or in the strong illumination of the photographing pattern (3), because the exposure time is long. However, since no light is projected in the photographing patterns (2) and (4), the object A is detected as "slight detection" in the photographing pattern (2) having a long exposure time, and is not detected in the photographing pattern (4) having a short exposure time. In the photographing pattern (5), since the exposure time is short, the object A is detected as "faint detection" in proportion to the short exposure time, as compared with the "clear detection" obtained in photographing pattern (1) with a long exposure time.

Next, in the cases of the object B which is distant from the camera, the object B cannot be detected except in the photographing pattern (3) with strong illumination and a long exposure time.

In addition, in the cases of the distant light emitter C, "faint detection" is obtained in the photographing patterns (1) and (5) where illumination is projected, while "slight detection" is obtained in the photographing pattern (3) because the strong illumination makes the light emitter C inconspicuous. Since the light emitter C is self-emitting, "clear detection" is obtained in the photographing patterns (2) and (4) in which the light projection is turned off.

A method of detecting three kinds of objects represented by the object A, the object B, and the light emitter C based on the photographing patterns (1) to (5) is described above.

In the photographing device of the example, since the stereo camera 10 is used, if "clear detection" of an object is obtained as shown by a black ellipse in FIG. 8, the disparity measuring unit 403 can correctly measure a distance to the object based on the disparity information.

For example, in the photographing pattern (1), the distance of the object A in the vicinity of the camera can be measured, and in the case of the photographing pattern (3), the distances of both the object A in the vicinity of the camera and the distant object B can be measured.

On the other hand, in the case of the light emitter C, although "clear detection" is obtained in the photographing pattern (2) and the photographing pattern (4), since the light emitter C is self-emitting, it is difficult to correctly recognize the shape of the light emitter, and as a result, the distance to the light emitter C may be erroneously detected.

In view of this, in the example, the photographing patterns (1) to (5) are selectively used, and the state determining unit 503 performs a determination to distinguish between the light emitter C and the object A or the object B from different image data obtained according to the photographing patterns (1) to (5).

Therefore, even if an abnormality occurs due to disturbance such as dirt or a blocking object on the stereo camera 10, an object or a light emitter can still be correctly determined, and it is possible to correctly measure what event it is.

[Processing Mode of Photographing Device]

Next, a result of the state determination in the state determining unit 503 of the state diagnosis unit 30, setting of a processing mode, and state transition thereof will be described with reference to FIG. 9 and FIG. 10.

FIG. 9 is a diagram showing the state transition of processing modes of the photographing device of the example, and FIG. 10 is a diagram showing a diagnostic pattern for a state diagnosis of the photographing device of the example and a determination result.

Four processing modes including a standby mode S1, a diagnostic mode S2, a maintenance mode S3, and an alert mode S4 in FIG. 9 correspond to the processing mode 97 in FIG. 10.

The standby mode S1 in FIG. 9 corresponds to a state in which nothing is performed. If a candidate having a certain possibility of abnormality is found at this stage, the process switches from the standby mode S1 to the diagnostic mode S2. After entering the diagnostic mode S2, as already described, photographing of the object A, the object B, the light emitter C or the like and diagnosis thereof are performed using the plurality of photographing patterns (1) to (5). In this case, the height, the orientation, and the illumination of the camera are changed to acquire various camera images for diagnosis.

If an intruder, for example, is found as a result of the diagnosis in the diagnostic mode S2, the process proceeds to the alert mode S4. In the alert mode S4, a display or an alarm is output to indicate that the alert mode is activated. Then, after the alarm or the like is notified, the process returns to the standby mode S1 again.

On the other hand, as a result of the diagnosis in the diagnostic mode S2, when it is determined that the candidate of the abnormality is not an intruder, but dirt on the lens, for example, the process proceeds to the maintenance mode S3, and after some maintenance is performed, the process returns to the standby mode S1.

As a result of the diagnosis in the diagnostic mode S2, if only the distant light emitter C is photographed and no special abnormality is recognized, the process returns to the standby mode S1 again.

FIG. 10 is an example of a table showing diagnostic patterns 98a to 98d in a case where an area is photographed based on the photographing patterns (1) to (5) of FIG. 7. The diagnostic patterns 98a to 98d are stored in the diagnostic pattern database 40 shown in FIG. 1 in advance.

Reference numerals 91 to 95 in a horizontal axis of FIG. 10 indicate image determination criteria based on image processing results obtained by the image processing unit 20 in FIG. 1 and FIG. 4. Since the determination criteria 91 to 95 correspond to the photographing patterns (1) to (5), in FIG. 10, the photographing patterns (1) to (5) shown in FIG. 7 and the determination criteria 91 to 95 are associated with each other.

Each row in FIG. 10 represents a diagnostic pattern. Here, in the diagnostic patterns 98a to 98d, numerical values used indicate how clearly an object is detected, and ">100" (a value over 100) indicates "clear detection" in which the object is photographed very clearly and accurately. In addition, ">20" (a value over 20) indicates "slight detection", and ">50" (a value over 50) indicates "faint detection" between the "clear detection" and the "slight detection". These numerical values can be freely set in accordance with conditions of photographing and diagnosis.

For example, in the case of the diagnostic pattern 98a, when a control mode of the stereo camera 10 is the photographing pattern (1), the nearby object A is clearly detected with the determination criteria 91. Then, it is determined as an "abnormal candidate" as shown by a determination result 96. When the "abnormal candidate" is determined in the determination result 96, the processing mode 97 switches from the "standby mode S1" to the "diagnostic mode S2" in FIG. 9.

Next, in the case of the diagnostic pattern 98b, "clear detection" is obtained in the photographing patterns (1) and (5) in which the light is projected, and "slight detection" is obtained in the photographing pattern (2) in which no light is projected. Nothing is detected in the photographing pattern (4) in which light is not projected and an exposure time is short. In addition, in the photographing pattern (5) in which light is projected to a nearby area and the exposure time is short, "faint detection" is obtained. In such a case, since there is a high possibility that attachment is adhered to the stereo camera 10, the result "attachment" is determined in the determination result 96, and the processing mode 97 switches to the "maintenance mode S3".

In addition, in the case of the diagnostic pattern 98c, "clear detection" is only obtained in the photographing pattern (3), and nothing is detected in the other photographing patterns (1), (2), (4), and (5). In this way, when only the distant object B is detected, the result "distant object" is determined in the determination result 96, and the processing mode 97 switches to the "alert mode S4". This is because the detected object may be an intruder when something is clearly detected in a distance of 10 m away, for example.

In the case of the diagnostic pattern 98d, "faint detection" is obtained in the photographing patterns (1) and (5) in which the light is projected, and "clear detection" is obtained in the photographing patterns (2) and (4) where no light is projected. In addition, in the photographing pattern (3) in which the light is projected to a distant area, "slight detection" is obtained. In this case, the detection shows the same trend as the detection result of the light emitter C of FIG. 8. Therefore, the detected object is determined as the light emitter C in the determination result 96. Then, it is determined that the object is not suspected of being an intruder, and the processing mode 97 remains in the "standby mode S1".

As described above, in the example, when detecting a state of an area monitored by the stereo camera 10, various images are acquired by illumination control of the camera and shutter control in the camera control, and the state of the monitored area is classified.

However, for example, when the light projecting unit 303 of FIG. 3 emits light to an area in the vicinity of the camera, an object whose position or orientation is detected as an object candidate at an initial stage is not detected as time elapses. In such a case, the detection may be determined to be a false alarm. Accordingly, in a case of photographing an object in a distant area, a false alarm is less likely to be determined because the object is detected for a relatively long period of time.

In other words, it is possible to determine whether the object is a nearby object or a distant object by moving the orientation of the camera. This is because, when an object is in the vicinity, movement of a detection position increases when the camera moves along movement of the object, and when the object is distant, the movement of the detection position reduces.

Although the stereo camera 10 is described in the example, it is evident that the same processing can be performed using two or more cameras, for example, three cameras.

In addition, in a case where the processing mode is "maintenance", for example, dirt is detected on either left or right of the stereo camera 10, which may cause a concern of performance degradation. In such a case, in order to ensure security, it is necessary to use a normal camera on which dirt is not detected to continue to execute some certain processing without stopping the operation. At the same time, by notifying a control center or the like, it is also possible to ensure a security level without stopping the system.

As an example of the photographing device of the invention, a photographing device and a photographing method for detecting a nearby object, a distant object and a light emitter using a stereo camera 10 based on disparity information thereof to diagnose a state of a monitored area have been described. However, the example described in the present example is only an exemplary embodiment, and it goes without saying that the invention includes other applications or modifications without departing from the gist of the invention as set forth in the claims.

For example, in the above-described exemplary embodiment, photographing patterns (1) to (5) are shown as the imaging modes, which are combinations of the intensity of light projection and the shutter exposure time. In contrast, intensity and a direction of light projection, exposure time, an aperture, an orientation (posture) of a camera, and a focal length of a lens may be dynamically controlled, and a plurality of photographing patterns may be set using a plurality of combinations of the parameters above. Further, the acquired photographing pattern may be set by using not only an RGB sensor as the image sensor, but also a sensor which is sensitive to infrared in addition to RGB, or by changing sensor sensitivity through gain adjustment or the like.

Some or all of the above-mentioned configurations, functions, processing units, processing means or the like may be realized by hardware, for example, by designing in an integrated circuit. In addition, the above-mentioned configurations, functions or the like may be realized by software by interpreting and executing programs that implement each function by a processor. Information of programs, tables, files or the like for implementing each function can be placed in a recording device such as a memory, hard disk, and solid state drive (SSD), or a recording medium such as an IC card, SD card, and DVD.

In addition, control lines and information lines show those considered to be necessary for the description, and not all the control lines and information lines are necessarily shown on the product. In practice, almost all the configurations are considered to be mutually connected.

REFERENCE SIGN LIST

10: stereo camera
20: image processing unit
30: state diagnosis unit
40: diagnostic pattern storing unit
50: camera control unit
60: output unit
201, 301 and 302: lens units
202: imaging unit
203: image generating unit
204: imaging control unit
205: adjustment unit
206 and 303: light projecting units
207: illumination control unit
208: posture control unit
304: stage
401: camera image acquiring unit
402: distortion correcting unit
403: disparity measuring unit
404: object detecting unit
501: result acquiring unit
502: data acquiring unit
503: state determining unit

The invention claimed is:

1. A photographing device comprising:
a stereo camera which is configured by two or more cameras;
an image processing unit which acquires disparity information based on image data from the stereo camera;
a diagnostic pattern database which stores information on a plurality of images having different photographing conditions obtained by the stereo camera as diagnostic patterns in advance;
a state diagnosis unit which determines a state of a camera and performs state diagnosis based on the disparity information obtained from the image processing unit with reference to the information on the plurality of images having different photographing conditions stored in the diagnostic pattern database; and
a camera control unit which performs at least one of illumination control, shutter control, and posture control of the stereo camera upon receiving a diagnosis result of the state diagnosis unit;
wherein the camera control unit dynamically controls intensity and direction of illumination, exposure time, aperture, camera orientation, sensor sensitivity and focal length, and based on a combination thereof, the stereo camera acquires the information on the plurality of images.

2. The photographing device according to claim 1, wherein the state diagnosis unit diagnoses four processing modes including a standby mode, a diagnostic mode, an alert mode, and a maintenance mode, and switches to any one of the four processing modes in accordance with a diagnosis result.

3. The photographing device according to claim 2, wherein the state diagnosis unit switches to a standby processing mode set in advance after switching to any one of the four processing modes in accordance with the diagnosis result.

4. The photographing device according to claim 1, wherein the image processing unit includes:
a camera image acquiring unit which acquires left and right camera images from the stereo camera;
a distortion correcting unit which corrects distortion of the camera image acquired by the camera image acquiring unit;
a disparity measuring unit which calculates the disparity information from the left and right camera images having distortion corrected by the distortion correcting unit; and
an object detecting unit which detects an object as a subject based on the disparity information calculated by the disparity measuring unit.

5. The photographing device according to claim 4, wherein the state diagnosis unit includes:
a result acquiring unit which acquires the disparity information input from the image processing unit;
a data acquiring unit, into which the disparity information acquired by the result acquiring unit is input, and which acquires a parameter to be determined by acquiring, from the diagnostic pattern database, the information on the plurality of images having different photographing conditions obtained by the stereo camera and stored in the diagnostic pattern database in advance; and
a state determining unit which determines a normal state or an abnormal state of the stereo camera based on the parameter to be determined acquired by the data acquiring unit.

6. A photographing method comprising:
a step of photographing a monitored area by a stereo camera to obtain data of left and right images;
a step of acquiring, by an image processing unit, disparity information of a photographed image based on the data of left and right images photographed by the stereo camera;
a step of storing information on a plurality of images having different photographing conditions photographed by the stereo camera in a diagnostic pattern database in advance as diagnostic patterns;
a step of determining a state of the camera and performing camera state diagnosis by a state diagnosis unit based on the disparity information acquired by the image processing unit and the information on the plurality of images having different photographing conditions stored in the diagnostic pattern database in advance;
a step of dynamically controlling intensity and direction of illumination, exposure time, aperture, camera orientation, sensor sensitivity and focal length, and based on a combination thereof, acquiring the information on the plurality of images.

* * * * *